(No Model.) 2 Sheets—Sheet 1.
H. W. POTTER.
APPLIANCE FOR BRANDING SHEEP OR OTHER ANIMALS.
No. 569,515. Patented Oct. 13, 1896.
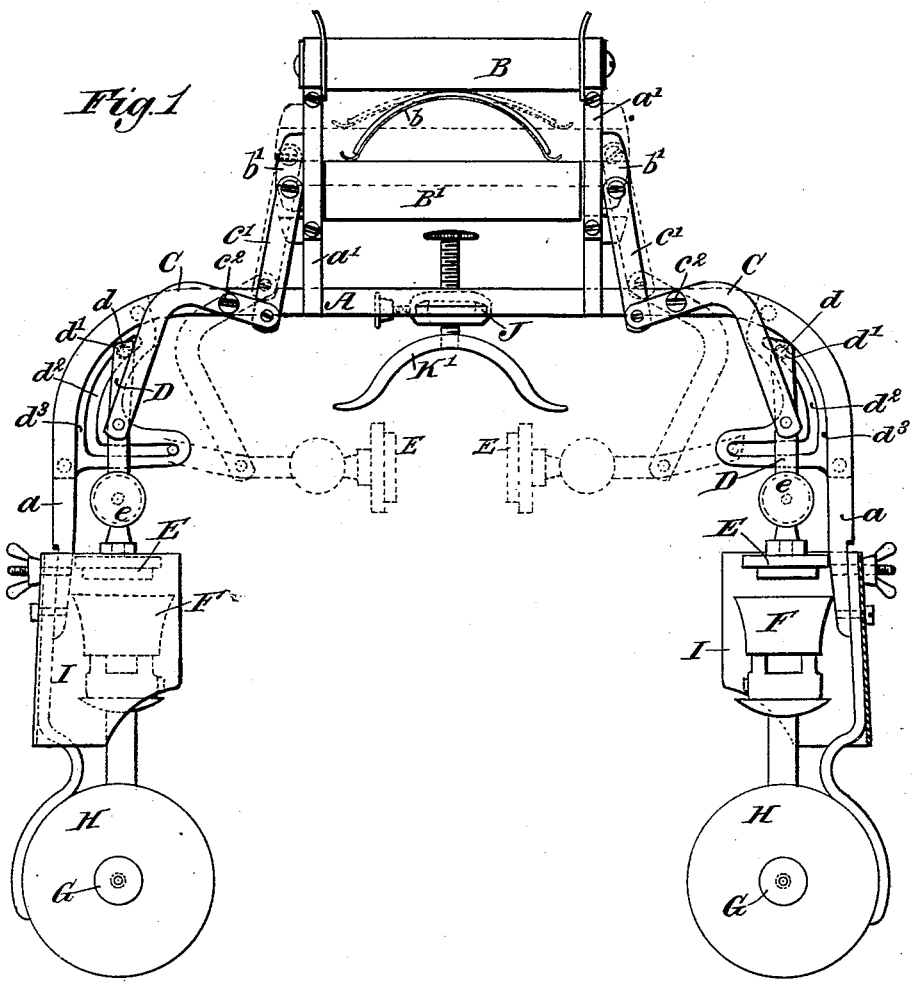
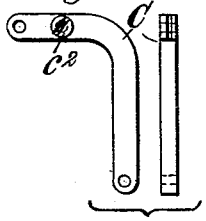
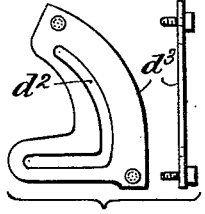
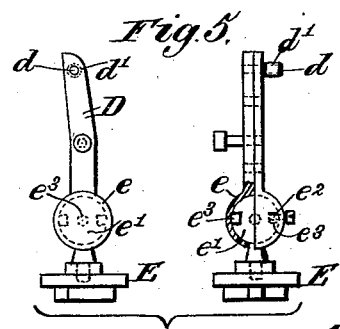
Witnesses.
Inventor.
Henry W. Potter.
By James L. Norris
Atty.
THE NORRIS PETERS CO., PHOTO-LITHO., WASHINGTON, D. C.

(No Model.) 2 Sheets—Sheet 2.
H. W. POTTER.
APPLIANCE FOR BRANDING SHEEP OR OTHER ANIMALS.
No. 569,515. Patented Oct. 13, 1896.
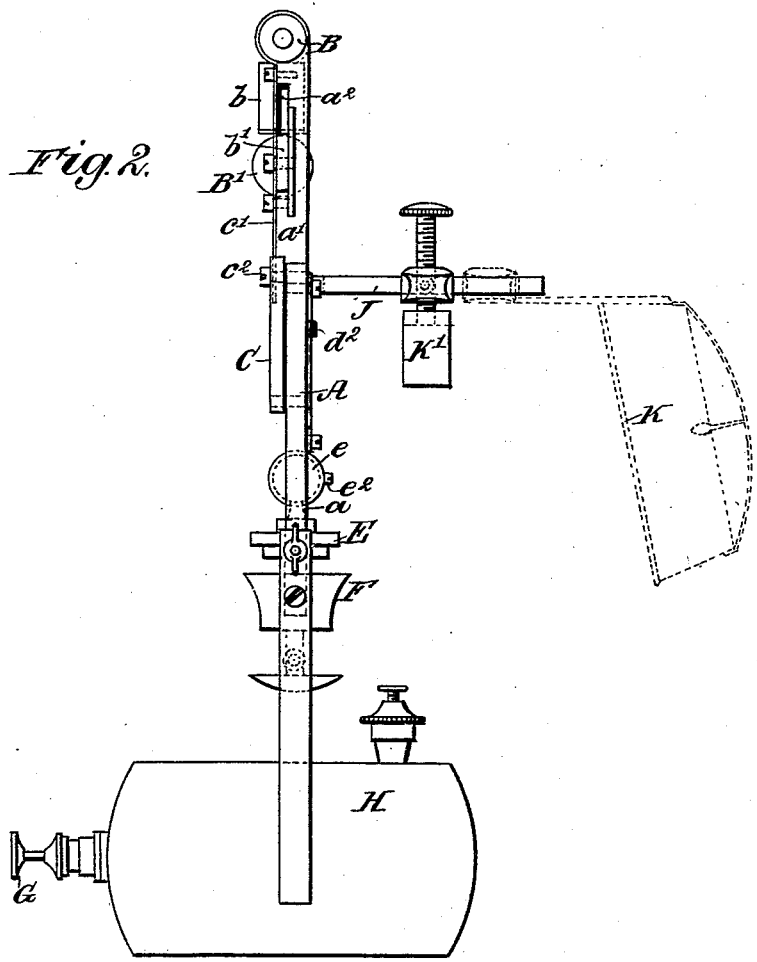
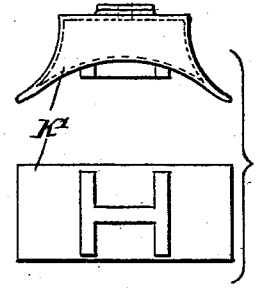
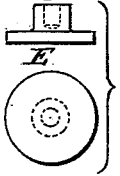
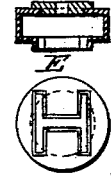
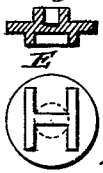
Witnesses.
Inventor:
Henry W. Potter
By James L. Norris
Atty.

UNITED STATES PATENT OFFICE.

HENRY WILLIAM POTTER, OF WELLINGTON, NEW ZEALAND, ASSIGNOR OF ONE-HALF TO SIMEON FRANKEL, OF SYDNEY, NEW SOUTH WALES.

APPLIANCE FOR BRANDING SHEEP OR OTHER ANIMALS.

SPECIFICATION forming part of Letters Patent No. 569,515, dated October 13, 1896.

Application filed June 11, 1896. Serial No. 595,197. (No model.)

*To all whom it may concern:*

Be it known that I, HENRY WILLIAM POTTER, architect, a subject of the Queen of Great Britain, residing at No. 14 Brandon Street, Wellington, in the British Colony of New Zealand, but temporarily residing at No. 29 Hunter Street, Sydney, in the British Colony of New South Wales, have invented an Improved Appliance for Marking or Branding Live Sheep or other Animals, of which the following is a specification.

The object of this invention is to provide an appliance for marking or branding live sheep and other animals, whereby brands or marks may be applied to the head of the animal either by means of heat or dye in such a manner as to render the brands or marks easily distinguishable and when so desired practically ineffaceable, also to provide means whereby three distinct brands or marks may be simultaneously made on the face of the animal.

It consists in an appliance comprising a stop or rest to regulate its position on the animal's head, as well as a pair of brands connected to a vertically-sliding operating-handle, whereby said brands can be moved toward each other at will, provision being made for the addition of a third brand, if desired, as well as for the substitution of one kind or character of brand for another, as may be required, and a suitable spring being provided to return the various parts of the appliance to their normal positions after each operation. When the appliance is to be used as a firebrand, a pair of suitable burners are provided for heating the brands.

Referring to the accompanying drawings, Figure 1 is a front, and Fig. 2 a side, elevation of my improved appliance for branding live sheep and other animals, but with the screens around the burners removed. Figs. 3 to 9 are various detail views of different parts of the appliance.

In its ordinary form the invention consists of a frame A, having downwardly-projecting bars $a$ at each end and two upwardly-projecting slotted guide-bars $a'$.

A fixed handle B is fitted between the upper ends of these slotted guide-bars $a'$, while underneath said fixed handle and parallel thereto is an operating-handle B', which is arranged to slide vertically in the slots $a^2$ in said guide-bars, a curved or other spring $b$ being arranged between said handles B B' in order to keep the operating-handle B' normally in its lowest position. Each of the projecting ends $b'$ of this said operating-handle B' is connected by a short pitman C' to a bell-crank lever C, Figs. 1, 2, and 3, fulcrumed, as shown at $c^2$, upon the frame A of the appliance. The opposite end of each of these bell-crank levers C is connected to a supporting-arm or traveling lever D, upon the free end of which either a fire or dye brand E is secured, while the opposite end of said arm or traveling lever is provided with a pin $d$, fitted with an antifriction-roller $d'$, working in a peculiarly-shaped cam-slot $d^2$, cut for the purpose in a bracket $d^3$, (see Fig. 4,) secured upon the frame A. This cam-slot $d^2$ is curved outwardly and downwardly from its upper end and at or about the center of its length it turns around at right angles to the curved part, and thence extends horizontally toward the center of the appliance. The effect of these cam-slots $d^2$, in combination with the bell-crank levers C, is to impart a somewhat peculiar motion to the brands E, the first part of the motion of the bell-crank levers being to raise said brands until their supporting-arms or traveling levers D are horizontal and the faces of said brands E are opposite to each other, while the second part of the motion is to move said brands horizontally toward each other until they come in contact with the side of the animal's face.

In order to allow the brands E to adjust themselves to variations in the shape of the heads of different animals, they are connected to the ends of the traveling levers D by ball-and-socket joints $e$ $e'$, (see Figs. 1, 2, and 5,) which while supporting them allow sufficient play for that purpose.

It will be evident that various kinds of brands may be fitted and used upon these traveling levers and that if desired a blank, such as is illustrated in Fig. 6, may be fitted on one side when it is desired to brand only on the one side.

When it is required to brand the animal with dye and not with fire, the brands may be made, as illustrated in Fig. 7, of small hollow vessels filled with cotton-wool or other absorbent material soaked in any of the well-known branding-dyes, such, for instance, as a mixture of nitrate of silver and peroxid of hydrogen or citrate of iron and ferrocyanid of potassium, the character to be impressed being cut in the face of the brand; but when a fire-brand is required they are made, as illustrated in Fig. 8, of small blocks of copper or other metal that will retain the heat and have the desired character raised upon them in the ordinary manner. With these latter brands some means for heating them must be provided. For this purpose a burner and a vessel to contain the requisite fuel is mounted upon the lower ends of the downwardly-projecting bars $a$ of the framework of the appliance, so that the flames will play upwardly upon the under side of the brand. Methylated spirit may be used as the fuel, and the burner may be such as is used in ordinary spirit-stoves, or kerosene may be burned, preferably in what is commonly known as the "Primus" burner, as illustrated at F in Figs. 1 and 2, a small air-pump G being preferably fitted in the end of the oil-reservoir H to maintain the requisite pressure on the surface of the fuel. Screens or shields I may be arranged around the backs of the burners F to shelter them from drafts.

Referring to Fig. 5, which illustrates one of the ball-and-socket joints used for connecting the brands to their supporting-arms or traveling levers D, $e$ represents one of the sockets upon said arms, and $e'$ the ball fitting same and to which the brand is secured. A set-screw $e^2$ passes through said socket and engages in one or other of four recesses $e^3$ in the ball $e'$, according to the angle or direction of the brand or mark required.

In order to adjust the position of the appliance on the animal's head, a slotted bracket J extends forwardly and horizontally from the frame A, and upon this bracket is clamped a nose-piece or regulator, which can be adjusted according to the varying sizes of the head of the animals to be branded and to the position where the brands are to be impressed. This regulator may take the form of a muzzle K (dotted in Fig. 2) to be fitted over the animal's nose, or it may be simply a bridge-piece or crutch K' to rest upon the animal's nose, or, if desired, both may be employed.

If it is desired to impress a third brand on the animal, the bridge-piece or crutch K' just referred to may be made hollow, as indicated in Fig. 9, and be filled with an absorbent material soaked in a suitable dye and have a number or other mark cut or stamped out of its under face to indicate, for instance, the year when the branding was effected.

If desired, a broad strap may be fitted across the top of the handle in order to assist in supporting the weight of the appliance, and provision is made for protecting the hand of the operator from the heat of the burners when the fire-brands are used.

The manner of using the hereinbefore-described appliance for branding sheep and other live animals is as follows: It is fitted over the head of the animal so that the bridge-piece or crutch K' rests upon its nose and the brands E hang downward on each side of its face. The two handles B and B' are then grasped by the hand of the operator, so as to draw the latter up toward the former against the resistance of the spring $b$, the effect being to turn the bell-crank levers C upon their fulcrums $c^2$ and cause the pins $d$ to travel down the curved part of the cam-slot $d^2$ until the brands have been raised into position opposite to each other. The continued movement of the bell-crank levers C will carry the arms D, together with the brands mounted upon them, inward toward each other until the brands come in contact with the animal's face and thus effect the branding, the ball-and-socket joints $e\,e'$ allowing them to adjust themselves to any inequalities on the animal's face, as hereinbefore described. After the operation the brands fall or return automatically into position over the burners F to be heated for the next operation. When it is required to brand only one side of the animal's face, a blank, such as is shown in Fig. 6, is fitted instead of the opposite brand, in order to effect the necessary resistance.

With the above-described appliance a large number of sheep or other live animals may be quickly branded with one, two, or three brands simultaneously, whereas the present processes only admit of one brand at a time being applied. Moreover, with this invention there is less danger of fire to sheds, &c., than there is with ordinary heated iron brands, and the system of branding does not injure the fleece, while the brands or marks being on the animal's face cannot be destroyed or removed without detection, and their position on the face enables them to be more readily discernible than when applied elsewhere, as, for instance, on the body or wool of the animal.

Having now particularly described and ascertained the nature of my said invention and in what manner the same is to be performed, I declare that what I claim is—

1. In an appliance for marking or branding live sheep and other animals, a brand upon the end of an arm or lever (such as D) in combination with a bracket having a cam-slot (such as $d'$); an operating bell-crank lever (such as C) and a pitman connecting said lever to an operating-handle substantially as and for the purposes specified.

2. In an appliance for marking or branding live sheep and other animals, a brand upon the end of an arm or lever (such as D) having a pin at its end fitted with an antifriction-roller working in a cam-groove of approximately the shape herein described, said arm or lever being connected to an operating-handle substantially as and for the purposes specified.

3. In an appliance for marking or branding live sheep and other animals, a pair of brands (such as E) adapted to be pressed against each side of the animal's face in combination with a pair of burners mounted upon the frame of the appliance, substantially as and for the purposes specified.

4. In an appliance for marking or branding live sheep and other animals, the combination of a frame provided with a fixed handle and a movable handle, and a spring to retain the said movable handle in normal position, one or more brands, and cam-guided lever mechanism for actuating the brand or brands from the movable handle of the appliance, substantially as specified.

5. In an appliance for marking or branding live sheep and other animals, the combination of a frame having a fixed handle and a movable handle, a set of three brands, one of which occupies a fixed central position to mark the top of the animal's nose and the two side brands being movable toward each other to brand or mark the sides of the animal's face, and cam-controlled lever mechanism for actuating the side brands from the movable handle of the appliance, substantially as specified.

HENRY WILLIAM POTTER.

Witnesses:
EDWARD WATERS, Jr.,
WALTER SMYKIE BAYSTON.